US012728656B2

(12) United States Patent
Hara

(10) Patent No.: US 12,728,656 B2
(45) Date of Patent: Sep. 8, 2026

(54) IMAGE FORMING APPARATUS

(71) Applicant: CANON KABUSHIKI KAISHA, Tokyo (JP)

(72) Inventor: Yoshiaki Hara, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 18/900,357

(22) Filed: Sep. 27, 2024

(65) Prior Publication Data

US 2025/0108645 A1 Apr. 3, 2025

(30) Foreign Application Priority Data

Oct. 2, 2023 (JP) ................................ 2023-171511

(51) Int. Cl.
*B41J 29/13* (2006.01)
*B41J 13/08* (2006.01)
*B41J 29/02* (2006.01)

(52) U.S. Cl.
CPC ............... *B41J 29/02* (2013.01); *B41J 13/08* (2013.01); *B41J 29/13* (2013.01)

(58) Field of Classification Search
CPC ............ B41J 29/00; B41J 29/02; B41J 29/13
See application file for complete search history.

(56) References Cited

U.S. PATENT DOCUMENTS

2011/0242621 A1 10/2011 Takeuchi
2017/0359470 A1 12/2017 Takahashi
2018/0272771 A1* 9/2018 Hayashi .................. B41J 29/02
2022/0365474 A1 11/2022 Kawasumi

FOREIGN PATENT DOCUMENTS

JP H1086481 A 4/1998
JP H1138711 A * 2/1999
JP 2022175261 A 11/2022

OTHER PUBLICATIONS

Takada, Machine TranslationofJPH1138711A, 1999 (Year: 1999).*

* cited by examiner

*Primary Examiner* — Scott A Richmond
(74) *Attorney, Agent, or Firm* — Canon U.S.A., Inc. IP Division

(57) ABSTRACT

An image forming apparatus can include an image forming unit, a conveyance unit, a housing, a first electrical member, a second electrical member, and a wire bundle, wherein a rotation space is left below a pre-image forming conveyance unit in the housing to enable the conveyance unit to be moved. The wire bundle can be routed from the rear to the front of the housing in a space below the conveyance unit in a separated position. A size of the space left in the housing can be changed according to the rotation space of the conveyance unit. The space in the housing, which includes a part of the rotation space preset in the housing for rotation of the conveyance unit, can be effectively used as a space for routing the wire bundle. Thus, the wire bundle is disposed without an increase in a size of the apparatus.

14 Claims, 8 Drawing Sheets

IMAGE FORMING APPARATUS

BACKGROUND

Field

The present disclosure relates to an image forming apparatus such as a printer, a copying machine, a facsimile, a multifunction peripheral, or the like.

Description of the Related Art

Image forming apparatuses, including printers, copying machines, facsimiles, and multifunction peripherals, are provided with various boards, such as a high-voltage board and a control board for controlling electrical members, such as various motors, sensors, and switches. These boards are mainly disposed in a position close to a rear surface of the image forming apparatus, and the electrical members that are electrically connected to the boards with wire bundles are generally also disposed in a position close to the rear surface of the image forming apparatus. However, placement of each unit that is disposed in the image forming apparatus sometimes leads to difficulty in gathering electrical members including the board in a position close to the rear surface, and in such cases, some electrical members are inevitably disposed in a position close to the front surface. Even in this case, to facilitate user's operation for replacement and maintenance of the electrical members and to realize downsizing of the apparatus, electrical members are connected to each other with wire bundles in a space-saving manner. As discussed in Japanese Patent Application Laid-Open No. 2022-175261, there is a configuration in which an electrical member disposed in a position close to the front surface of an apparatus is electrically connected to an electrical member disposed in a position close to the rear surface via a relay unit of a wire bundle.

SUMMARY

According to some embodiments, an image forming apparatus includes an image forming unit configured to form an image on a sheet, a conveyance unit configured to convey the sheet in a conveyance direction along a first direction, a housing including a first frame disposed on a first side of the conveyance unit in a second direction intersecting the first direction and a second frame disposed on a second side opposite to the first side of the conveyance unit in the second direction, a first electrical member disposed on the first frame of the housing, a second electrical member disposed on the second frame of the housing, and a wire configured to electrically connect the first electrical member and the second electrical member, wherein the conveyance unit moves between a first position where the conveyance unit conveys the sheet and a second position different from the first position in a third direction perpendicular to an image forming surface of the sheet being conveyed by the conveyance unit at the first position, wherein a first space and a second space communicated to the first space are provided inside the housing, wherein the conveyance unit moves between the first position and the second position through the first space, and wherein the wire is disposed in the second space and on a first side of the second position while the first position is on a second side of the second position, the second side being opposite to the first side.

Further features of the present disclosure will become apparent from the following description of exemplary embodiments with reference to the attached drawings.

DESCRIPTION OF THE EMBODIMENTS

Image forming apparatuses for use in commercial printing operate at higher speeds and have higher printing accuracy and thus tend to include many electrical members. Further, the image forming apparatus for use in commercial printing often includes a main housing and another housing connected to the main housing on its sides, which leads to difficulty in accessing the electrical members of the main housing from the side of the main housing. Thus, replacement and maintenance of the electrical members are generally performed from the front, where access is easy. In such a case, a wire bundle is routed from an electrical member disposed in a position close to the front surface to an electrical member disposed in a position close to on the rear surface. With an increase in the number of electrical members, the number of wire bundles for supplying power and/or for transmitting electrical signals also increases, and a large space is used to route the wire bundles, which results in upsizing of the image forming apparatus due to allocation of the space to the routing.

The following exemplary embodiments leads to the achievement of providing an image forming apparatus in which a wire bundle is disposed between a first electrical member disposed in the front and a second electrical member disposed in the rear without upsizing the image forming apparatus.

Various exemplary embodiments, features, and aspects of the present disclosure will be described below with reference to the attached drawings. An image forming apparatus according to the present exemplary embodiment is described with reference to FIG. 1. A description will be given of an ink jet recording apparatus 100 that is a sheet type apparatus and forms an image on a sheet by using ink and a reaction solution, as an example of an image forming apparatus. A sheet may be any recording material capable of receiving ink, for example a paper sheet, such as a plain paper sheet or a thick paper sheet, a plastic film sheet for an overhead projector, a sheet with a special shape, such as an envelope or an index paper sheet, or a cloth sheet.

Figure 1:
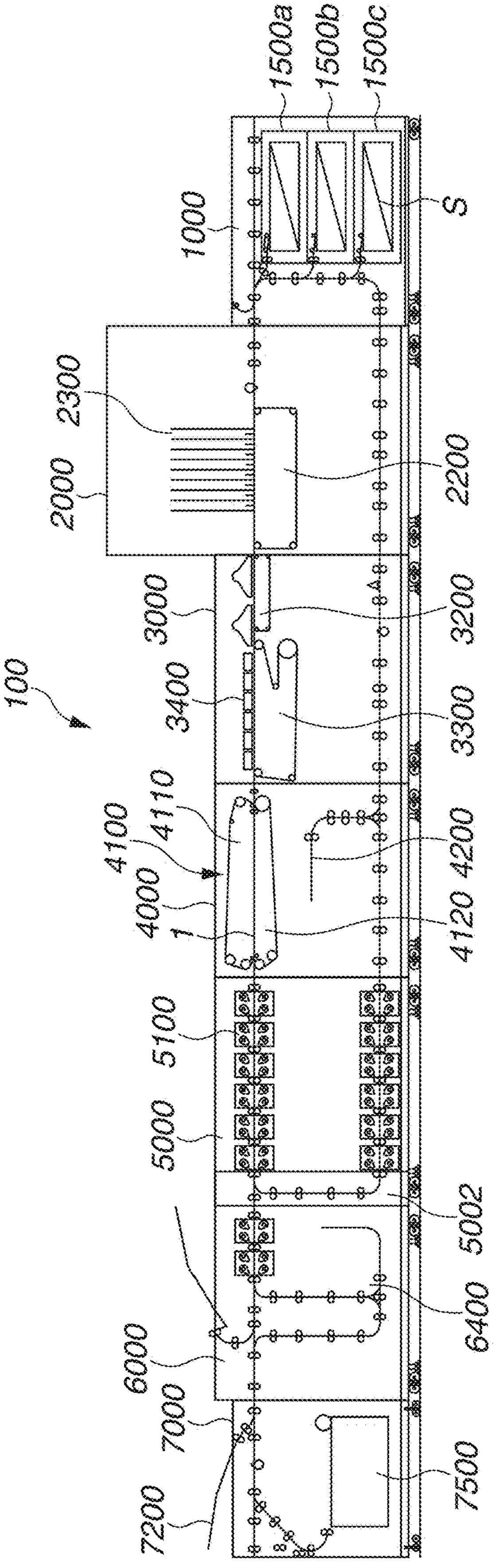
FIG. 1 is a schematic diagram illustrating an ink jet recording apparatus.

In the present specification, a side on which a user stands to operate the ink jet recording apparatus 100 is referred to as a front surface (or front) and a side opposite to the front surface is referred to as a rear surface (or rear). Left and right sides viewed from the front surface are respectively referred to as left and right. FIG. 1 illustrates the ink jet recording apparatus 100 viewed from the front surface.

Ink Jet Recording Apparatus

As illustrated in FIG. 1, the ink jet recording apparatus 100 includes a sheet feeding module 1000, a printing module 2000, a drying module 3000, a fixing module 4000, a cooling module 5000, a reversing module 6000, and a stacking module 7000. A sheet S fed from the sheet feeding module 1000 is subjected to various types of processing during conveyance along a conveyance path in each module and is finally discharged to the stacking module 7000.

The sheet feeding module 1000, the printing module 2000, the drying module 3000, the fixing module 4000, the cooling module 5000, the reversing module 6000, and the stacking module 7000 may each have separate housings, and these housings may be connected to form the ink jet recording apparatus 100. Alternatively, the sheet feeding module 1000, the printing module 2000, the drying module 3000, the fixing module 4000, the cooling module 5000, the reversing module 6000, and the stacking module 7000 may be disposed in one housing.

The sheet feeding module 1000 includes containers 1500*a*, 1500*b*, and 1500*c* that store the sheets S therein. The containers 1500*a* to 1500*c* are disposed to be able to be pulled out in a direction toward the front to store the sheets S therein. The sheet S is fed one by one by a separation belt and a conveyance roller from each of the containers 1500*a* to 1500*c* and conveyed to the printing module 2000. The number of the containers 1500*a* to 1500*c* is not limited to three and may be one, two, or four or more.

The printing module 2000 includes a pre-image forming conveyance unit 2400 (see FIG. 2 described below), a print belt unit 2200, and a recording unit 2300. The tilt and position of the sheet S conveyed from the sheet feeding module 1000 are corrected by the pre-image forming conveyance unit 2400, and the corrected sheet S is conveyed to the print belt unit 2200. The recording unit 2300 is disposed in a position facing the print belt unit 2200 with respect to the conveyance path. The recording unit 2300 is a sheet processing unit that performs recording processing (printing) to form an image on the conveyed sheet S from above using a recording head. The sheet S is suctioned and conveyed by the print belt unit 2200, and thus a clearance is left between the sheet S and the recording head. A plurality of recording heads is disposed along a conveyance direction (first direction). According to the present exemplary embodiment, the recording unit 2300 includes a total of five line type recording heads each corresponding to a different one of four colors of ink, yellow (Y), magenta (M), cyan (C), and black (Bk) and a reaction solution.

The number of ink colors and the number of recording heads are not limited to five. As an ink jet recording method, a method using a heating element, a method using a piezoelectric element, a method using an electrostatic element, and a method using a micro electro mechanical systems (MEMS) element can be adopted. The ink of each color is supplied to the recording head from an ink tank (not illustrated) via an ink tube. The sheet S on which printing is performed in the recording unit 2300 is conveyed by the print belt unit 2200, and an inline scanner (not illustrated) disposed in a position downstream of the recording unit 2300 in the conveyance direction can detect misalignment and color density of the image formed on the sheet S and correct a printing image.

The drying module 3000 includes a decoupling unit 3200, a drying belt unit 3300, and a hot air blowing unit 3400. The drying module 3000 reduces a liquid content of the ink applied to the sheet S, which improves fixing property of the ink to the sheet S in the fixing module 4000 serving as the subsequent module. The sheet S having the image formed thereon is conveyed to the decoupling unit 3200 disposed in the drying module 3000. The decoupling unit 3200 generates a frictional force between the sheet S and a belt by a pressure of a wind blowing from above and causes the belt to convey the sheet S. The sheet S on the belt is thus conveyed with the frictional force, so that the sheet S is prevented from shifting during the conveyance by the print belt unit 2200 and the decoupling unit 3200.

The sheet S conveyed from the decoupling unit 3200 is suctioned and conveyed by the drying belt unit 3300, and the hot air blowing unit 3400 disposed above the belt blows hot air to dry the ink applied to the sheet S.

The fixing module 4000 includes a fixing belt unit 4100. The fixing belt unit 4100 passes the sheet S conveyed from the drying module 3000 through a path between heated upper and lower belt units to fix the ink to the sheet S.

The cooling module 5000 includes a plurality of cooling units 5100 that cools the high-temperature sheet S conveyed from the fixing module 4000. The cooling unit 5100, for example, draws outside air into a cooling box using a fan to increase a pressure inside the cooling box and cools the sheet S by blowing air from the cooling box through a nozzle under pressure. The cooling units 5100 are disposed on both sides of the conveyance path of the sheet S to cool both sides of the sheet S.

The cooling module 5000 includes a conveyance path switching unit 5002. The conveyance path switching unit 5002 switches the conveyance path of the sheet S based on whether the sheet S is to be conveyed to the reversing module 6000 or to be conveyed to a double-sided conveyance path for double-sided printing to form images on both sides of the sheet S.

The reversing module 6000 includes a reversing unit 6400. The reversing unit 6400 reverses the front and back of the sheet S being conveyed and changes an orientation of the sheet S to be discharged to the stacking module 7000 between the front and back. The stacking module 7000 includes a top tray 7200 and a stacking unit 7500 and stacks the sheet S conveyed from the reversing module 6000 thereon.

In double-sided printing, the sheet S is conveyed to the conveyance path below the cooling module 5000 by the conveyance path switching unit 5002. Subsequently, the sheet S passes through the fixing module 4000, the drying module 3000, the printing module 2000, and the double-sided conveyance path in the sheet feeding module 1000 and is returned to the printing module 2000. A double-sided conveyance unit of the fixing module 4000 includes a reversing unit 4200 that reverses the front and back of the sheet S. An image is formed with ink on the other surface, on which image forming is not performed, of the sheet S returned to the printing module 2000, and the sheet S is discharged to the stacking module 7000 via the drying module 3000, the fixing module 4000, the cooling module 5000, and the reversing module 6000.

Printing Module

Figure 2:
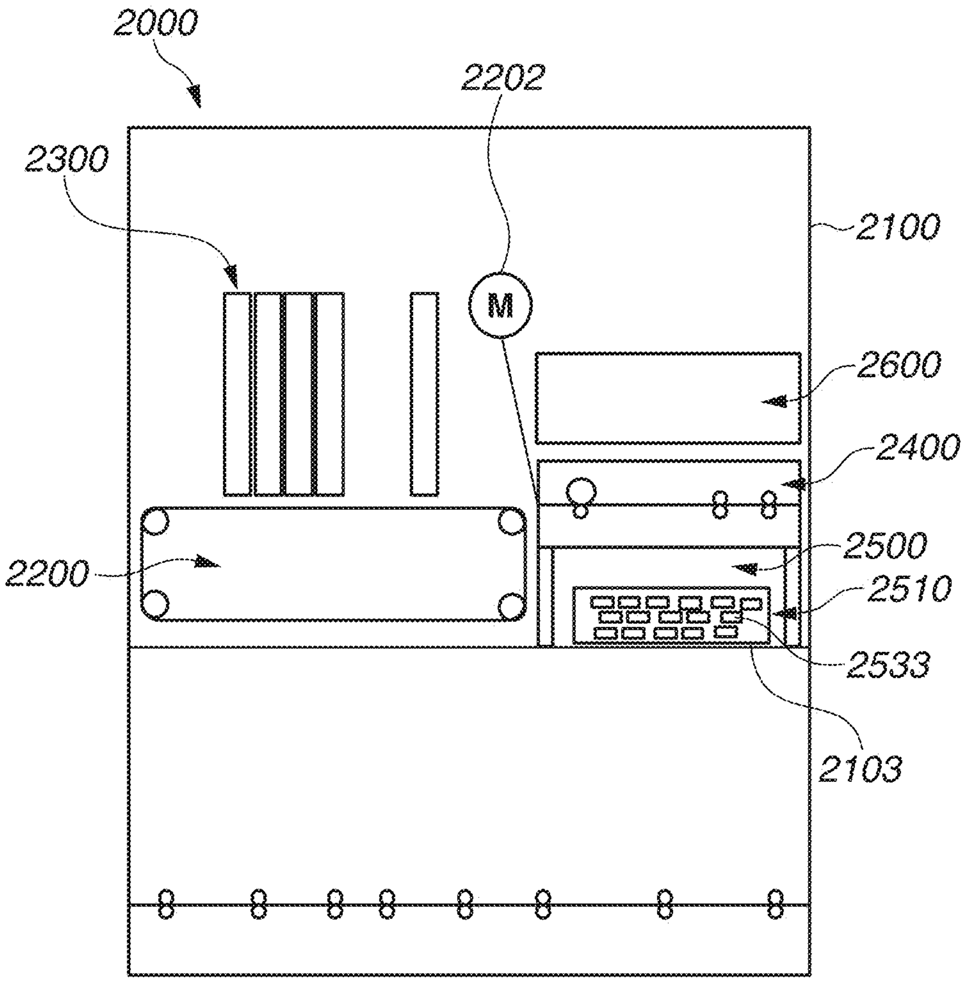
FIG. 2 is a schematic diagram illustrating a printing module.

The printing module 2000 is described with reference to FIG. 2. As illustrated in FIG. 2, the printing module 2000 includes a head maintenance unit 2600 and a relay unit 2500 in addition to the pre-image forming conveyance unit 2400, the print belt unit 2200, and the recording unit 2300. The pre-image forming conveyance unit 2400 is disposed in a position upstream of the print belt unit 2200 in the conveyance direction and conveys the sheet S to the print belt unit 2200 in accordance with driving of a drive motor 2202. The head maintenance unit 2600 is disposed above the pre-image forming conveyance unit 2400. The head maintenance unit 2600 is movably disposed with respect to the recording unit 2300, whereby the recording heads included in the recording unit 2300 are protected and cleaned when printing is not being performed.

A housing 2100 of the printing module 2000 includes a front side plate that is disposed in the front, a rear side plate that is disposed in the rear and supports each unit together with the front side plate, stays that connect the front and rear side plates, a frame that supports the front and rear side plates, and other plate-shaped sheet metals. The housing 2100 includes an exterior cover that forms the exterior and is able to be removed or opened and closed. The exterior cover includes, for example, a front surface cover in the front, side surface covers in the right and left, and a rear surface cover in the rear.

The print belt unit 2200 and the pre-image forming conveyance unit 2400 are detachably disposed in the housing 2100. The user removes the front surface cover to perform maintenance and replacement of a component and removes the print belt unit 2200 or the pre-image forming conveyance unit 2400 from the housing 2100 as necessary. In the present exemplary embodiment, in a case where the print belt unit 2200 or the pre-image forming conveyance unit 2400 is removed from the housing 2100, the user first removes a wire bundle from the relay unit 2500 and thus can release electrical connection. The wire bundle is a bundle of a plurality of signal lines (cables) that transmit different electrical signals.

Relay Unit

In the present exemplary embodiment, electrical members, such as a motor that operates the print belt unit 2200, a motor that operates the pre-image forming conveyance unit 2400, and a detection sensor (not illustrated) that detects the sheet S are disposed in a position close to the front surface of the printing module 2000. Meanwhile, in a position close to the rear surface of the printing module 2000, a board 2700, such as a control board that controls entire operation of the printing module 2000 and rotation of the motor, is disposed (see FIG. 6). To electrically connect the electrical members disposed in the position close to the front surface and the board 2700 disposed in the position close to the rear surface with the wire bundles, the relay unit 2500 is disposed in the printing module 2000.

Figure 3:
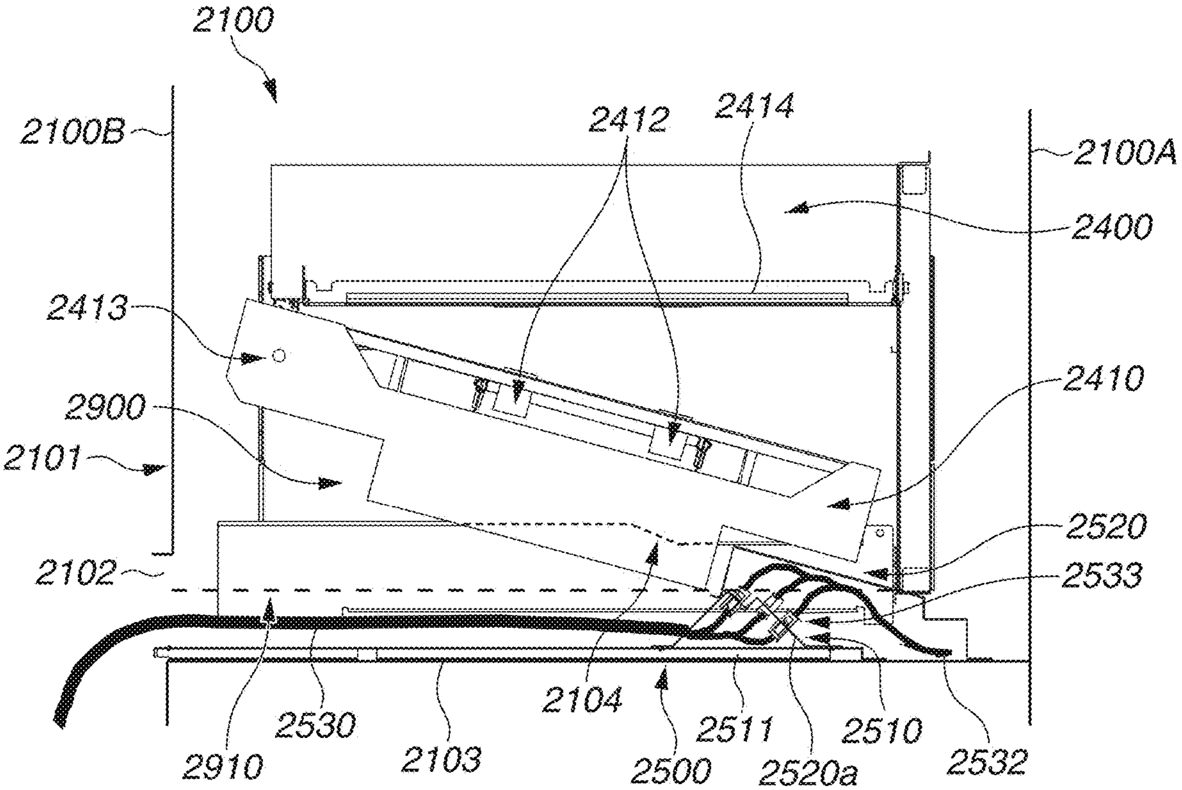
FIG. 3 is a cross-sectional view illustrating a state in which a conveyance path in a pre-image forming conveyance unit is opened.

Placement of the wire bundle according to the present exemplary embodiment is described with reference to FIGS. 2 to 8. FIG. 3 is a cross-sectional view illustrating a state in which the conveyance path in the pre-image forming conveyance unit 2400 is opened.

As illustrated in FIG. 3, the pre-image forming conveyance unit 2400 includes a conveyance guide 2414 and a conveyance unit 2410, and the conveyance guide 2414 and the conveyance unit 2410 forms a conveyance path. In the present exemplary embodiment, the conveyance guide 2414, together with the conveyance unit 2410, is disposed between a front surface frame 2100A serving as a first frame disposed in the front (front side) and a rear surface frame 2100B serving as a second frame disposed in the rear (rear side) within the housing 2100 and forms the conveyance path through which the sheet S passes in a direction (first direction) intersecting the front-rear direction (second direction). The conveyance unit 2410 includes a conveyance roller 2412 that rotates to convey the sheet S, and the conveyance roller 2412 serving as a rotating member is driven to rotate by the drive motor 2202 (see FIG. 2).

When a jam of the sheet S occurs in the conveyance path, which is formed by the conveyance guide 2414 and conveyance unit 2410, and through which the sheet S passes, the jam of the sheet S is detected by the board 2700 (see FIG. 6) based on a signal from the detection sensor (not illustrated). In a case where the jam of the sheet S is detected, the user exposes the conveyance path to perform jam processing to remove the sheet S remaining in the conveyance path.

In the present exemplary embodiment, the user pulls the conveyance unit 2410 downward and exposes the conveyance path to remove the sheet S from the conveyance path. To enable the user to do so, the conveyance unit 2410 is disposed in such a manner that the front of the conveyance unit 2410 rotates up and down with respect to the conveyance guide 2414 with a rotating shaft 2413 as a rotation center disposed in a position close to the rear surface frame 2100B, which is in the position close to the rear surface of the housing 2100. In addition, a rotation space 2900 (first space) in which the conveyance unit 2410 is rotatable to a position where the sheet S can be removed is left below the pre-image forming conveyance unit 2400 in the housing 2100. The rotation space 2900 is a rotation area in which the conveyance unit 2410 rotates.

The conveyance unit 2410 serving as a second member is disposed to be movable with respect to the conveyance guide 2414 between a conveyance position (first position) in which the sheet S is able to be conveyed by the conveyance roller 2412 and a separated position (second position) in which the conveyance unit 2410 is separated from the conveyance guide 2414 to open the conveyance path, through which the sheet S passes, and conveyance of the sheet S by the conveyance roller 2412 is not be able to be performed. The conveyance guide 2414 serving as a first member is disposed to form the conveyance path through which the sheet S passes with the conveyance unit 2410. In a case where the conveyance unit 2410 is in the separated position, the user can remove the sheet S remaining on the conveyance unit 2410.

Figure 4:
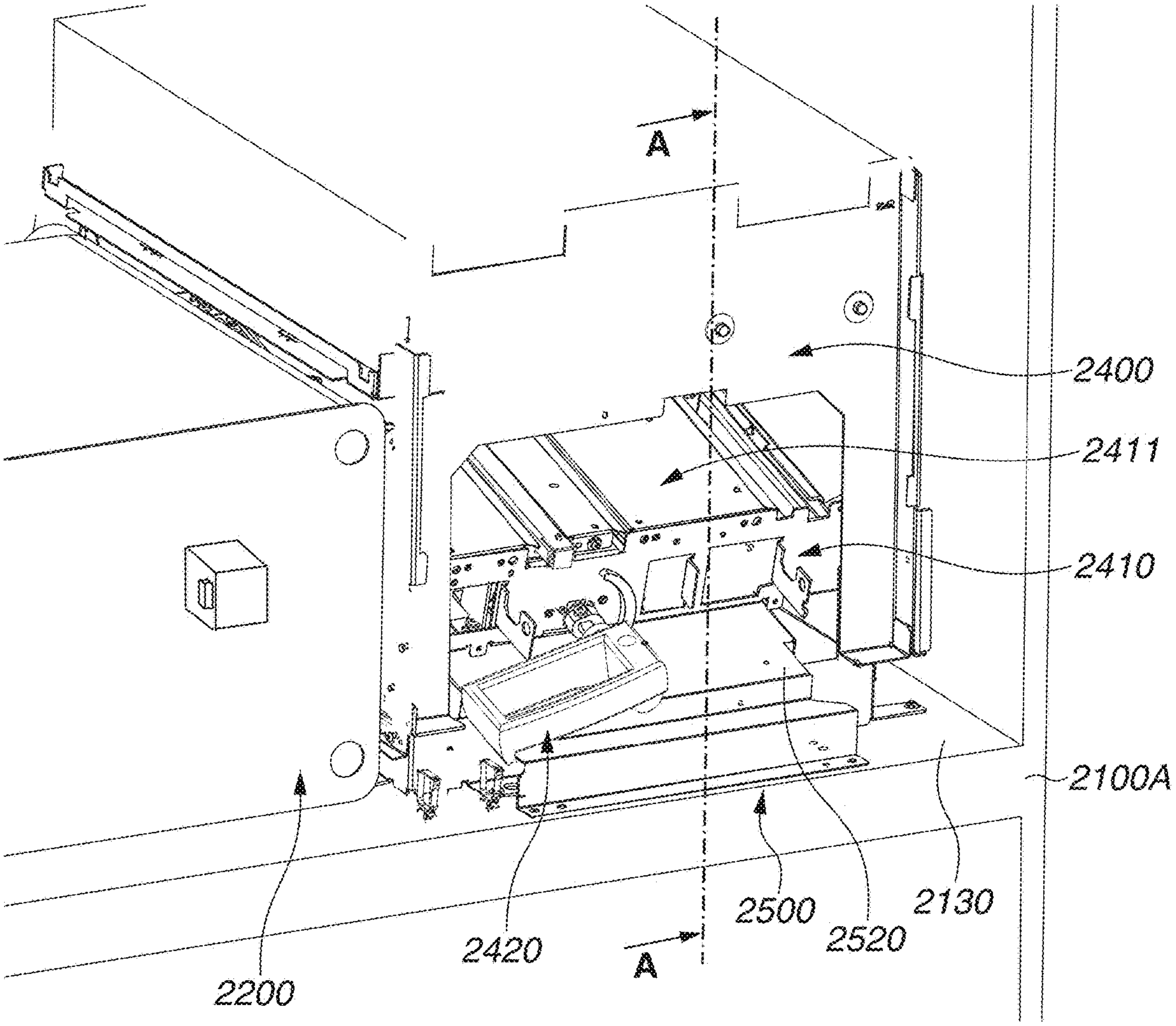
FIG. 4 is a perspective view illustrating a state in which the conveyance path in the pre-image forming conveyance unit is opened.

FIG. 4 is a perspective view illustrating a state in which the conveyance path in the pre-image forming conveyance unit 2400 is opened. As illustrated in FIG. 4, a lever 2420 having a lock function is disposed in front of the conveyance unit 2410, and the user can release the lock and rotate the conveyance unit 2410 by operating the lever 2420.

Figure 5:
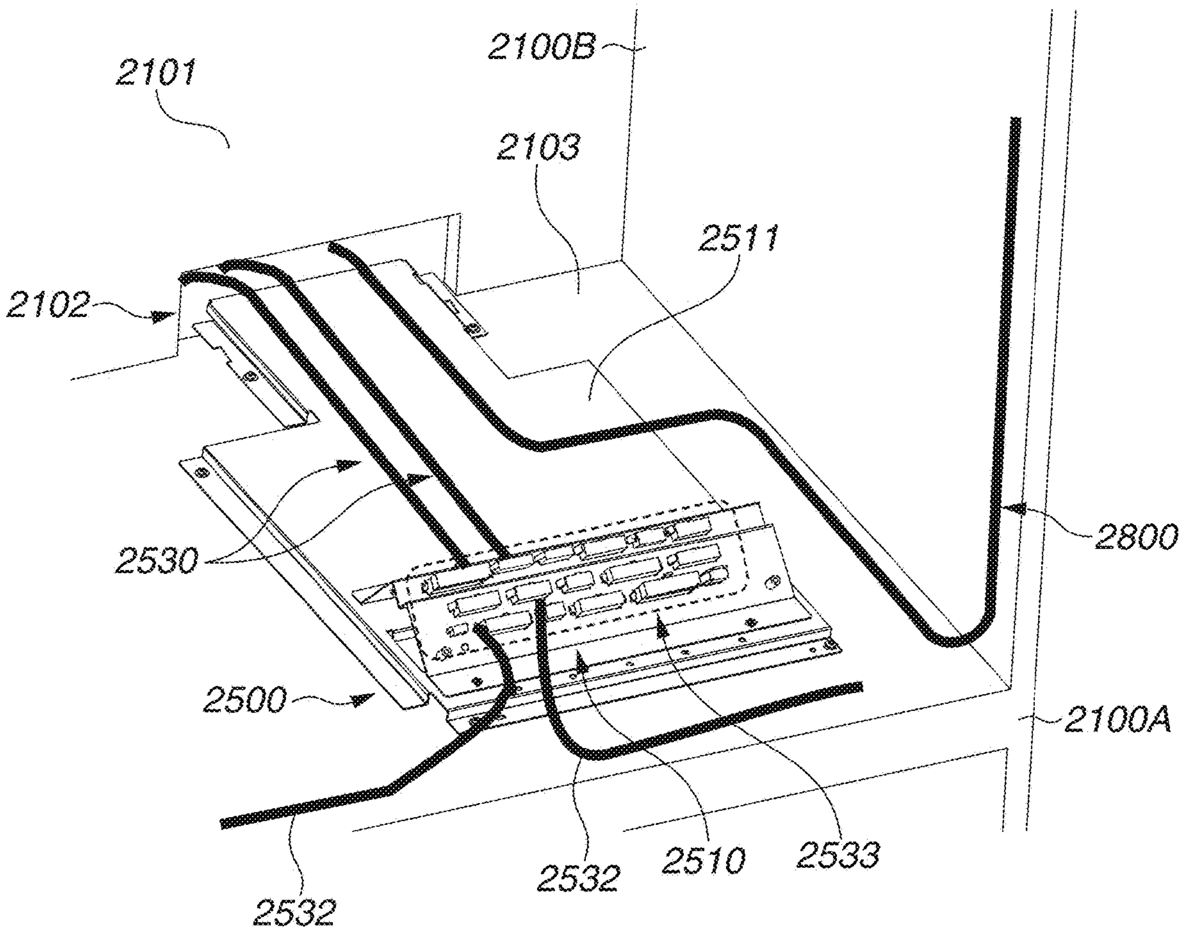
FIG. 5 is a perspective view illustrating a relay unit disposed in the printing module.

FIG. 5 is a perspective view illustrating the relay unit 2500 and a wire bundle 2530. As illustrated in FIG. 5, the relay unit 2500 includes a connector base 2510 and a wire bundle holding unit 2511. A plurality of relay connectors 2533 is disposed on the connector base 2510 serving as an arrangement base. The wire bundle of the electrical member and the wire bundle of the board are insertable into and removable from the relay connectors 2533. According to the present exemplary embodiment, as an example, a wire bundle 2532 as a first wire bundle that is connected to the drive motor 2202 (see FIG. 2) serving as the first electrical member or the detection sensor (not illustrated), and the wire bundle 2530 as a second wire bundle that is connected to the board 2700 (see FIG. 6) serving as the second electrical member are each inserted into the relay connector 2533.

Accordingly, the drive motor 2202 of the pre-image forming conveyance unit 2400, the detection sensor, and the like are electrically connected to the board 2700 via the relay unit 2500.

The connector base 2510 is fixed to the front of the wire bundle holding unit 2511, and the wire bundle holding unit 2511 is fixed to a partition plate 2103. The wire bundle holding unit 2511 holds the wire bundle 2530 connected to the board 2700 while guiding the wire bundle 2530 from the rear to the front of the housing 2100. It is desirable that the wire bundle holding unit 2511 include a groove portion into which the wire bundle 2530 is fitted and a wire bundle clamp that holds the wire bundle 2530 to guide the wire bundle 2530 drawn into the housing 2100 through a through hole 2102 formed on a rear side plate 2101 to the connector base 2510.

The wire bundle holding unit 2511 holds a tube bundle 2800 that is aligned with the wire bundle 2530 and drawn into the housing 2100 through the through hole 2102 in the similar manner as the wire bundle 2530. The tube bundle 2800 is a bundle of tubes of respective ink colors connected to the head maintenance unit 2600. The tube bundle 2800 is disposed to deliver unnecessary ink from the head maintenance unit 2600 to a waste ink tank (not illustrated) disposed in a position close to the rear surface.

The relay unit 2500 includes a connector cover 2520 that covers the connector base 2510 in a detachable manner as illustrated in FIGS. 3 and 4. The connector cover 2520 as a cover member is disposed to prevent the conveyance unit 2410 from coming into contact with and damaging the relay connector 2533, the wire bundle 2530, and the tube bundle 2800 on the connector base 2510 at the time of processing for clearing the jam of the sheet S.

According to the present exemplary embodiment, for example, in a case where the conveyance unit 2410 is rotated by 15 degrees, the conveyance unit 2410 abuts on a regulation unit 2104 disposed on the partition plate 2103 as illustrated in FIG. 3, whereby the rotation of the conveyance unit 2410 is regulated. The regulation unit 2104 protrudes from the partition plate 2103 in such a manner that a gap is formed between a lower surface of the conveyance unit 2410 and the connector cover 2520 when the conveyance unit 2410 is rotated by 15 degrees. With this configuration, the conveyance unit 2410 does not come into contact with the connector cover 2520, and thus the conveyance unit 2410 and the connector cover 2520 can be prevented from being damaged due to contact.

The relay unit 2500 is disposed on the wire bundle holding unit 2511 in such a manner that the front of the connector base 2510 on which the relay connector 2533 is disposed is lower than the rear of the connector base 2510 as illustrated in FIG. 3. With this configuration, a sufficient workspace for the user to insert and remove the wire bundles 2532 and 2530 into and from the relay connector 2533 is left between the connector base 2510 and the lower surface of the conveyance unit 2410. Further, visibility of the relay connector 2533 for the user looking at the relay unit 2500 is improved, which leads to the improvement of workability of the user inserting and removing the wire bundles 2532 and 2530 into and from the relay connector 2533.

In the present exemplary embodiment, the wire bundle 2530 is disposed in the front-rear direction from the rear to the front of the housing 2100 from the rotation space 2900 (first space) that is left below the pre-image forming conveyance unit 2400 for rotation of the conveyance unit 2410 to a space 2910 (second space) that is on an opposite side of the conveyance guide 2414 with respect to the conveyance unit 2410 in the separated position as illustrated in FIG. 3. The relay unit 2500 is disposed in the space 2910. The rotation space 2900 and the space 2910 are communicated with each other. In contrast, the partition plate 2103 below the conveyance unit 2410 separates the space including the rotation space 2900 and the space 2910 from the other spaces in the housing 2100. The pre-image forming conveyance unit 2400 moves between the conveyance position and the separated position through the rotation space 2900. In another aspect, the rotation space 2900 may be defined as a motion trace of the pre-image forming conveyance unit 2400 when it moves between two positions. The wire bundle 2530 is disposed in the space 2910 and on a first side (lower side) of the separated position. The conveyance position is provided on a second side (upper side) of the separated position which is opposite to the first side.

Figure 6:
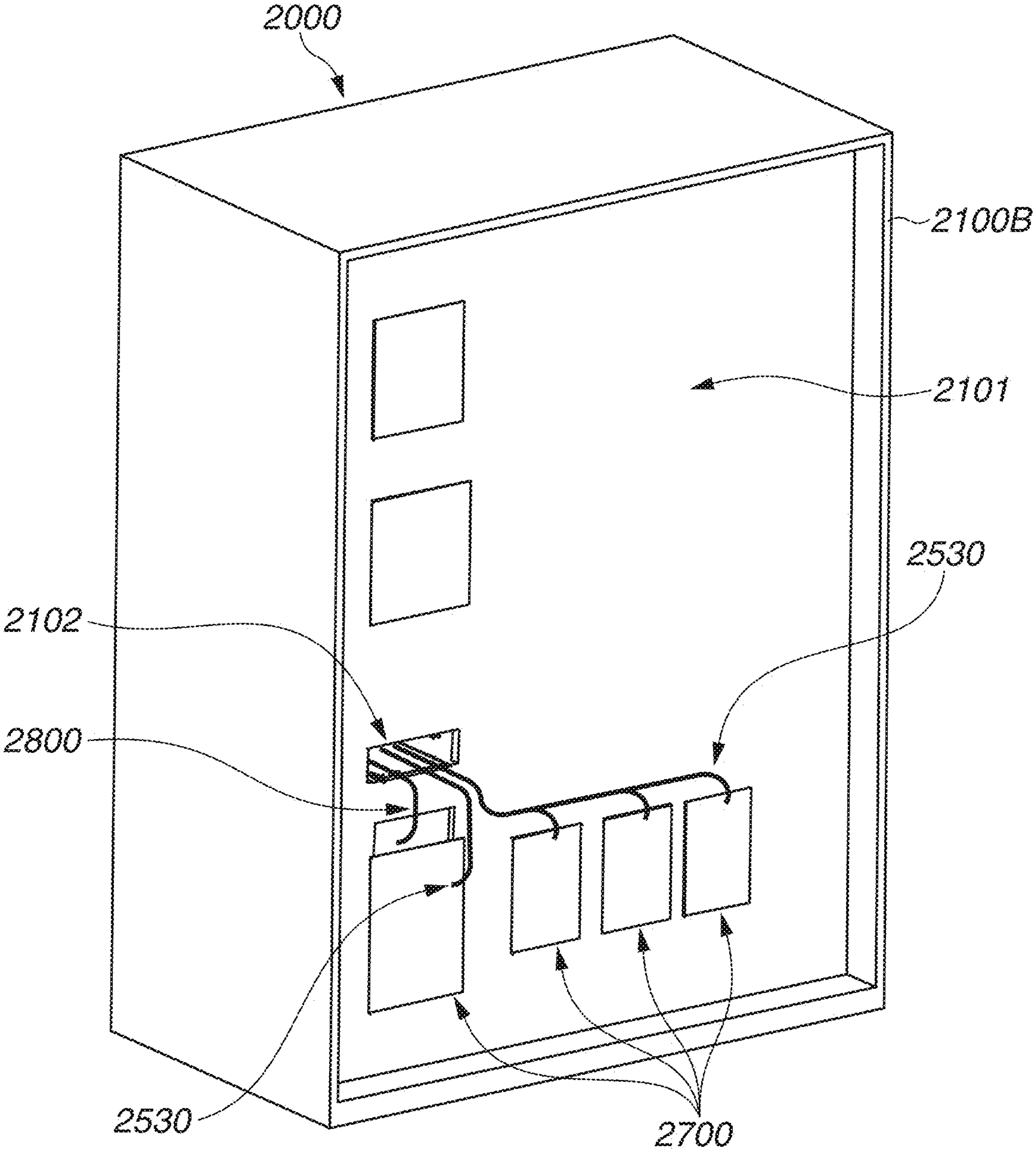
FIG. 6 is a perspective view illustrating a rear surface side of the printing module.

As illustrated in FIG. 5, the wire bundle 2530 connected to the relay connector 2533 of the connector base 2510 is held by the wire bundle holding unit 2511 and routed through the through hole 2102 of the rear side plate 2101 to the board 2700 disposed in a position close to the rear surface. As illustrated in FIG. 6, the board 2700 is disposed in a position close to the rear surface frame 2100B (second side) of the printing module 2000, and the wire bundle 2530 that is connected to the board 2700 passes through the through hole 2102 on the rear side plate 2101, then branches and is connected to each board 2700.

Figure 7:
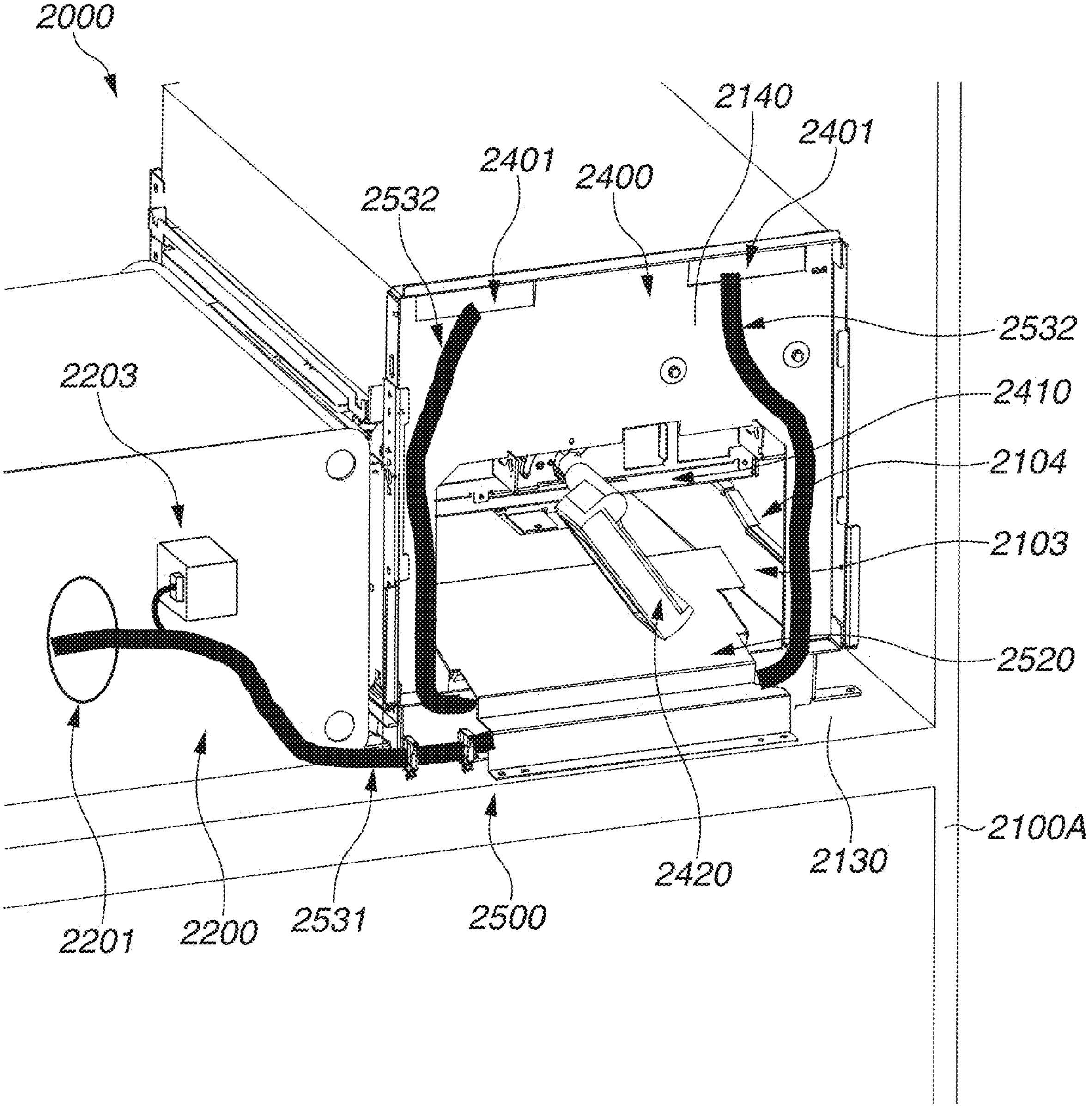
FIG. 7 is a diagram illustrating routing of wire bundles.
Figure 8:
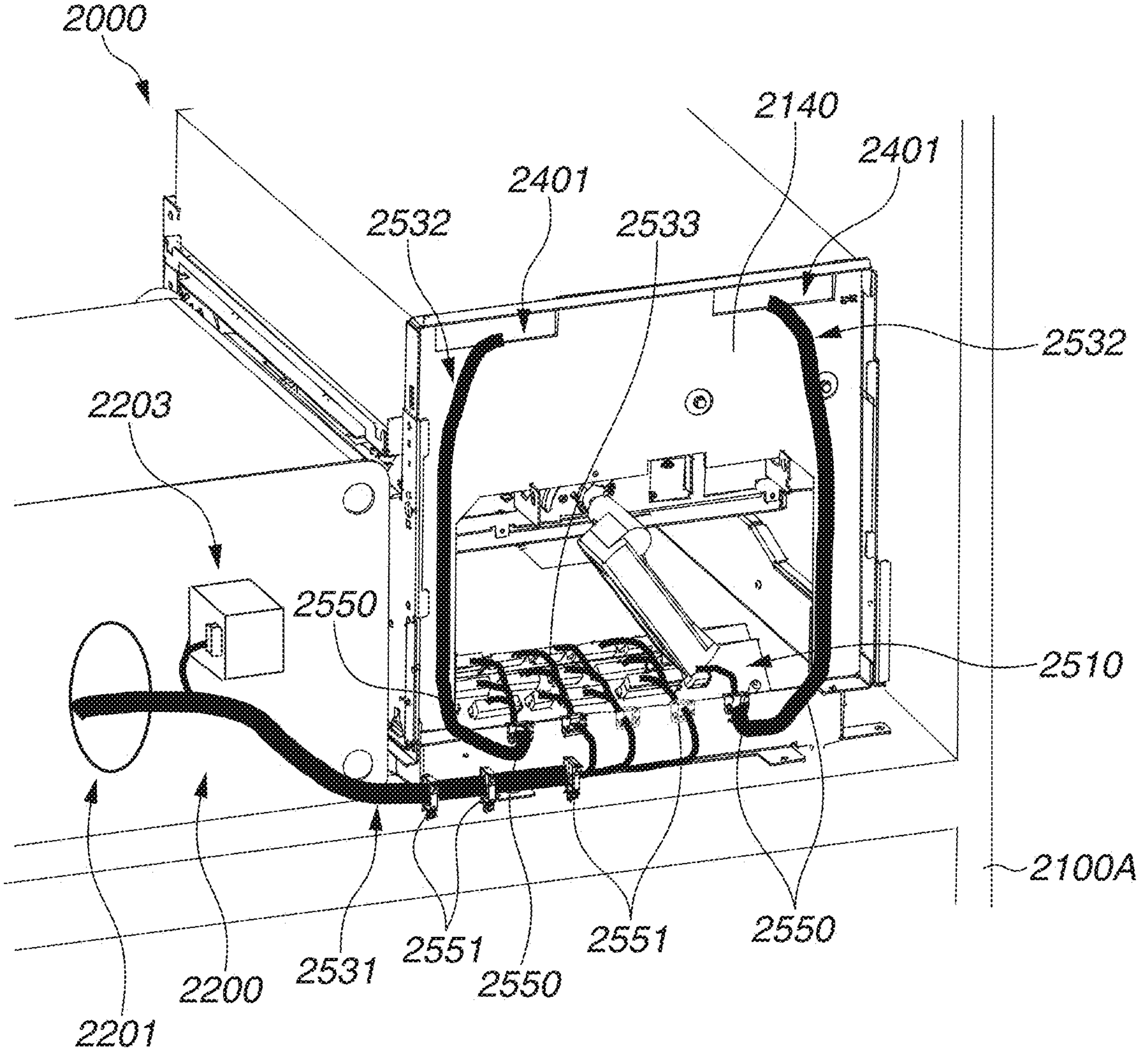
FIG. 8 is a perspective view illustrating a state in which a connector cover is removed.

As illustrated in FIG. 5, the wire bundle 2532 connected to the relay connector 2533 of the connector base 2510 is routed in a right-left direction (the conveyance direction of the sheet S) in a position close to the front surface. This is because the wire bundle 2532 connected to the drive motor 2202 (see FIG. 2) of the pre-image forming conveyance unit 2400 or the detection sensor (not illustrated) is pulled out to a position close to the front surface frame 2100A (first side) of the printing module 2000 via through holes 2401 formed in two parts on the right and left of a front side plate 2140 as illustrated in FIGS. 7 and 8. In addition, this is because the connector cover 2520 is attached in a state in which the wire bundle 2532 is connected to the relay connector 2533.

As illustrated in FIG. 8, it is desirable that the wire bundle 2532 is held by a plurality of wire bundle clamps 2550. The plurality of wire bundle clamps 2550 forms a route for routing the wire bundle 2532. As illustrated in FIG. 8, a wire bundle 2531 connected to a motor 2203 of the print belt unit 2200 is pulled out from a through hole 2201 formed on the front side plate to a position close to the front surface of the printing module 2000 and is connected to the relay connector 2533. The wire bundle 2532 may be held and routed by wire bundle clamps 2551.

As described above, according to the present exemplary embodiment, the wire bundle 2530 is disposed in the space 2910 below the conveyance unit 2410. The relay unit 2500 that relays the wire bundle 2530 to the wire bundle 2532 may be disposed in the space 2910. A size of the space 2910 is changed in the up-down direction (third direction) in which the conveyance unit 2410 rotates according to the rotation space 2900 that is left for the conveyance unit 2410 in the housing 2100. A size of the rotation space 2900 in the conveyance unit 2410 is adjustable in assembly of the printing module 2000 within a range in which the sheet S is removable from the conveyance path. Thus, a part of the rotation space 2900 preset in the housing 2100 for rotation of the conveyance unit 2410 is also usable as the space 2910 for disposing of the wire bundle 2530 and the relay unit 2500. In other words, the space inside the housing 2100 is effectively utilizable. Therefore, the wire bundle that electrically connects the electrical member disposed in the position close to the front surface and the board disposed in the position close to the rear surface is able to be disposed without increasing the size of the image forming apparatus.

According to some embodiments, an image forming apparatus can include an image forming unit, a conveyance unit, a housing, a first electrical member, a second electrical member, and a wire bundle, wherein a rotation space is left below a pre-image forming conveyance unit in the housing to enable the conveyance unit to be moved. The wire bundle can be routed from the rear to the front of the housing in a space below the conveyance unit in a separated position. A size of the space left in the housing can be changed according to the rotation space of the conveyance unit. The space in the housing, which includes a part of the rotation space preset in the housing for rotation of the conveyance unit, can be effectively used as a space for routing the wire bundle. Thus, the wire bundle can be disposed without an increase in a size of the apparatus.

OTHER EXEMPLARY EMBODIMENT

According to the above-described exemplary embodiment, the ink jet recording apparatus 100 that ejects ink to form an image on a sheet S is described as an example of an image forming apparatus, but the present disclosure is not limited to this example. The present disclosure can be applied to an electrophotographic type image forming apparatus that forms a toner image on a sheet S using toner. In the case of the electrophotographic type, the image forming apparatus may be a lateral (substantially horizontal) conveyance type image forming apparatus that forms a toner image on a sheet S being conveyed in a conveyance path in the horizontal direction, or a vertical (substantially vertical) conveyance type image forming apparatus that forms a toner image on a sheet S being conveyed in a conveyance path in the vertical direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-171511, filed Oct. 2, 2023, which is hereby incorporated by reference herein in its entirety.

What is claimed is:

1. An image forming apparatus comprising:
- an image forming unit configured to form an image on a sheet;
- a conveyance unit configured to convey the sheet in a conveyance direction along a first direction;
- a housing including a first frame disposed on a first side of the conveyance unit in a second direction intersecting the first direction and a second frame disposed on a second side opposite to the first side of the conveyance unit in the second direction;
- a first electrical member disposed on the first frame of the housing;
- a second electrical member disposed on the second frame of the housing; and
- a wire configured to electrically connect the first electrical member and the second electrical member,
- wherein the conveyance unit moves between a first position where the conveyance unit conveys the sheet and a second position different from the first position in a third direction perpendicular to an image forming surface of the sheet being conveyed by the conveyance unit at the first position,
- wherein a first space and a second space communicated to the first space are provided inside the housing,
- wherein the conveyance unit moves between the first position and the second position through the first space, and
- wherein the wire is disposed in the second space and on a first side of the second position while the first position is on a second side of the second position, the second side being opposite to the first side.

2. The image forming apparatus according to claim 1, wherein the conveyance unit is configured to be rotatable about a rotating axis.

3. The image forming apparatus according to claim 2, further comprising:
- a shaft disposed in a position closer to the second frame than to the first frame and configured to provide the rotating axis.

4. The image forming apparatus according to claim 1, further comprising:
- a partition plate disposed below the conveyance unit and configured to separate the first space and the second space from a third space provided in the housing,
- wherein the wire is disposed between the partition plate and the second position.

5. The image forming apparatus according to claim 1, further comprising a holding unit configured to guide and hold the wire.

6. The image forming apparatus according to claim 1, further comprising:
- a relay unit,
- wherein the wire includes a first wire connected to the first electrical member and a second wire bundle connected to the second electrical member, and
- wherein the relay unit is configured to relay an electrical connection between the first wire and the second wire.

7. The image forming apparatus according to claim 6, wherein the relay unit is disposed in a position closer to the first frame than to the second frame.

8. The image forming apparatus according to claim 6,
- wherein the relay unit comprises:
  - a plurality of relay connectors to which the first wire bundle or the second wire bundle is connected, and
  - an arrangement base on which the plurality of relay connectors are arranged,
- wherein the arrangement base includes in inclined portion having a first edge and a second edge,
- wherein a distance in the second direction from the first frame to the first edge is shorter than a distance in the second direction from the first frame to the second edge, and
- wherein the inclined portion of the arrangement base is inclined in such a manner that the first edge is lower than the second edge.

9. The image forming apparatus according to claim 6, further comprising a cover member configured to cover the relay unit.

10. The image forming apparatus according to claim 9, further comprising a position limiter configured to limit a movement range of the conveyance unit to avoid a contact between the conveyance unit at the second position and the cover member.

11. The image forming apparatus according to claim 1,
- wherein the conveyance unit includes a rotation member configured to convey a sheet, wherein the first electrical member includes a motor configured to drive the rotation member, and wherein the second electrical member includes a control board configured to control rotation of the motor.

12. The image forming apparatus according to claim 1, further comprising:

a lever configured to change a lock state and an unlock state of the conveyance unit, wherein the conveyance unit in the lock state is restricted from moving from the first position to the second position, and wherein the conveyance unit in the unlock state is allowed to move between the first position and the second position.

13. The image forming apparatus according to claim 1, further comprising:

a holding unit, and an ink tube, wherein the image forming unit includes a print head configured to form an image by an ink jet recording, and wherein the holding unit hold and guide the wire and the ink tube.

14. The image forming apparatus according to claim 1, wherein the first direction and the second direction are respectively parallel to a horizontal direction, and wherein the third direction is parallel to a vertical direction.

* * * * *